(12) United States Patent
Xia et al.

(10) Patent No.: US 9,098,858 B2
(45) Date of Patent: Aug. 4, 2015

(54) VISUALIZING EXPRESSIONS FOR DYNAMIC ANALYTICS

(75) Inventors: Steven Qian Xia, Singapore (SG); Yean Fee Ho, Singapore (SG)

(73) Assignee: SYBASE, INC., Dublin, CA (US)

( * ) Notice: Subject to any disclaimer, the term of this patent is extended or adjusted under 35 U.S.C. 154(b) by 728 days.

(21) Appl. No.: 12/831,634

(22) Filed: Jul. 7, 2010

(65) Prior Publication Data

US 2012/0011458 A1    Jan. 12, 2012

(51) Int. Cl.
*G06F 17/00* (2006.01)
*G06Q 30/02* (2012.01)
*G06F 3/0484* (2013.01)

(52) U.S. Cl.
CPC ............ *G06Q 30/02* (2013.01); *G06F 3/04847* (2013.01)

(58) Field of Classification Search
None
See application file for complete search history.

(56) References Cited

U.S. PATENT DOCUMENTS

| | | | | |
|---|---|---|---|---|
| 2002/0174049 | A1* | 11/2002 | Kitahara | 705/36 |
| 2004/0032420 | A1* | 2/2004 | Allen et al. | 345/700 |
| 2004/0186765 | A1 | 9/2004 | Kataoka | |
| 2005/0017973 | A1* | 1/2005 | Cazabon et al. | 345/426 |
| 2005/0187851 | A1* | 8/2005 | Sant | 705/36 |
| 2007/0005479 | A1 | 1/2007 | Ikeda et al. | |
| 2007/0234236 | A1* | 10/2007 | Champion et al. | 715/833 |
| 2011/0087985 | A1* | 4/2011 | Buchanan et al. | 715/771 |

FOREIGN PATENT DOCUMENTS

| | | |
|---|---|---|
| JP | 2005-182559 A | 7/2005 |
| JP | 2007-011990 A | 1/2007 |
| KR | 10-2007-0013663 A | 1/2007 |
| WO | WO 03/081492 A1 | 10/2003 |

OTHER PUBLICATIONS

English-Language Abstract for Japanese Patent Publication No. 2005-182559 A, published Jul. 7, 2005, from http://worldwide.espacenet.com; 2 pages.
English-Language Abstract for Korean Patent Publication No. 10-2007-0013663 A, published Jan. 31, 2007, from http://worldwide.espacenet.com; 1 page.
International Search Report and the Written Opinion of the International Searching Authority directed to related International Patent Application No. PCT/US2011/043075, mailed Feb. 9, 2012, from the Korean Intellectual Property Office; 9 pages.

* cited by examiner

*Primary Examiner* — Stephen Hong
*Assistant Examiner* — Keith Bloomquist
(74) *Attorney, Agent, or Firm* — Sterne, Kessler, Goldstein & Fox P.L.L.C.

(57) ABSTRACT

Embodiments relate to a computer-implemented method for visualizing expressions for dynamic analytics. A graphical user interface control is generated for each of one or more variables of an expression. Each of the one or more variables is bound to the corresponding graphical interface control generated previously. Then, the generated graphical user interface control for each of the one or more variables of the expression is graphically output using a display device. A user may input an adjusted value of each of the one or more variables of the expression using the corresponding graphical user interface control.

25 Claims, 10 Drawing Sheets

VISUALIZING EXPRESSIONS FOR DYNAMIC ANALYTICS

BACKGROUND

1. Field

Embodiments relate generally to the field of analytics software applications, and particularly to applications for manipulating and viewing analytic data.

2. Background

The advancement of analytics software applications now allows users to quickly analyze large sets of data to discover and understand historical patterns in order to gauge the effectiveness of current business strategies and to appropriately adjust these strategies to improve business performance in the future. The use of analytic expressions (or simply "expressions") is the foundational technique for supporting analytics applications.

Expressions generally comprise a particular notation pattern that allows analytics application developers to describe and parse data within an analytic framework. Further, expressions allow application developers to conveniently construct analytic arithmetic formulas with rich semantic features. The technique of using expressions for analytics benefits end users by providing powerful analytic capabilities that are customized to the specific application domain of the end user. End users, in turn, are able to discover Key Performance Indicators (KPI) from large amounts of data.

Dynamic analytics allows end users to modify and execute expressions in real-time. The ability to modify and execute expressions in such a way not only extends the usefulness of the analytics applications, but also improves its flexibility. However, ease of use poses a significant challenge for users. Most users have difficulty understanding and using expression syntax. Thus, applications that simply expose expression syntax and leave it to end users to directly make modifications to expressions present usability problems for many users. In addition, users may introduce syntax and/or semantic errors if they are allowed to modify expressions directly.

Thus, users need a user-friendly capability to modify expressions for dynamic analytics without having to edit the actual syntax of the expressions. Further, analytics application developers need a capability to graphically present or visualize analytics expressions for users and enable such users to modify expression variables without exposing expression syntax.

BRIEF SUMMARY

Embodiments relate to methods and systems for visualizing expressions for dynamic analytics. In an embodiment, a computer-implemented method for visualizing expressions for dynamic analytics is provided. An expression having a plurality of variables is evaluated using expression data corresponding to the variables. Graphical user interface controls for the variables of the expression are generated. Each variable of the expression is bound to one or more of these generated graphical user interface controls. The bound graphical user interface controls for the variables of the expression are graphically displayed. An adjusted value of at least one of the variables is received from a user, who adjusts at least one of the variables using the graphical user interface controls that are bound to the variables. The expression is then re-evaluated using the adjusted value(s).

In an another embodiment, a system for visualizing expressions for dynamic analytics includes an expression evaluator, a UI control generator, and a GUI manager. The expression evaluator is configured to evaluate an expression having a plurality of variables using expression data corresponding to the variables. The UI control generator is configured to generate one or more graphical user interface controls for the variables of the expression, and further configured to bind each variable of the expression to the one or more generated graphical user interface controls. The GUI manager is configured to graphically display the bound graphical user interface controls for the variables of the expression, and further configured to receive from a user an adjusted value of at least one of the variables. The user adjusts the variables using graphical user interface controls that are bound to the variables. In addition, the expression evaluator is further configured to re-evaluate the expression using the adjusted value(s) of the variables.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number. Further, the accompanying drawings, which are incorporated herein and form part of the specification, illustrate the embodiments of present invention and, together with the description, further serve to explain the principles of the invention and to enable a person skilled in the relevant art(s) to make and use the invention.

DETAILED DESCRIPTION

Table of Contents
I. Introduction
II. System Overview
III. Visualizing Expressions for Dynamic Analytics
IV. Sales Planning Example for Visualizing Dynamic Analytics
   A. Visualizing Expression Variables for Sales Products
   B. Enabling Sales Promotions
V. Method
   A. User Process for Viewing and Modifying Visualized Expression Variables
   B. Visualizing Expressions for Dynamic Analytics
VI. Example Computer System Implementation
VII. Conclusion

I. INTRODUCTION

Embodiments relate to graphically presenting, or visualizing, expressions, including expression variables, for dynamic analytics applications. While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

II. SYSTEM OVERVIEW

Figure 1:
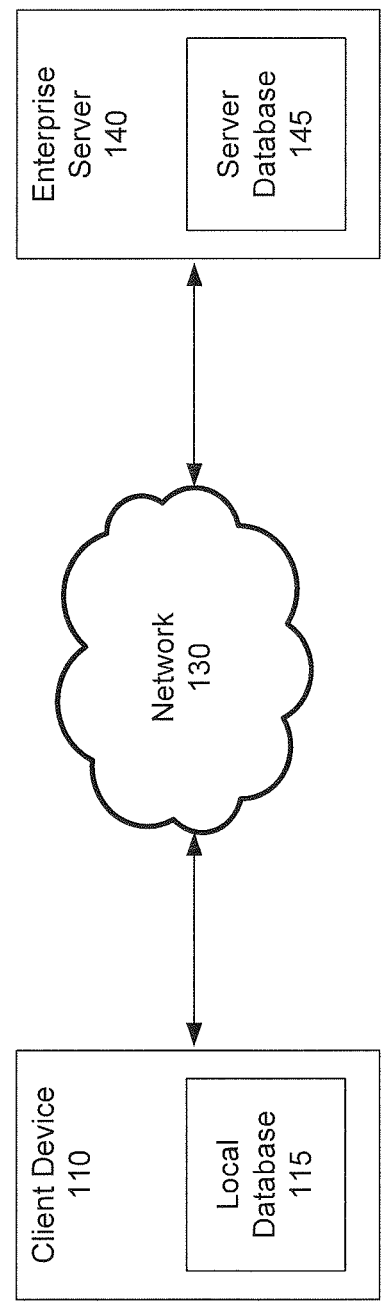
FIG. 1 is a diagram of an exemplary distributed system in which embodiments can be implemented.

FIG. 1 is an illustration of an exemplary distributed system 100 in which embodiments described herein can be implemented. Distributed system 100 includes a client device 110 that is communicatively coupled to enterprise server 140 through network 130. Client device 110 can be any type of computing device having one or more processors, a user input (for example, a touch-screen, mouse, QWERTY keyboard, microphone, or a T9 keyboard), and a communications infrastructure capable of receiving and transmitting data over a network. For example, computing device 110 can include, but is not limited to, a mobile phone or other mobile device, a personal digital assistant (PDA), a computer, a cluster of computers, a set-top box, or other similar type of device capable of processing instructions and receiving and transmitting data to and from humans and other computing devices. Similarly, enterprise server 140 can be any type of server or computing device capable of serving data to client device 110.

Network 130 can be any network or combination of networks that can carry data communication. Such network can include, but is not limited to, a wired (e.g., Ethernet) or a wireless (e.g., Wi-Fi and 3G) network. In addition, network 130 can include, but is not limited to, a local area network, medium area network, and/or wide area network such as the Internet. Network 130 can support protocols and technology including, but not limited to, Internet or World Wide Web protocols and/or services. Intermediate network routers, gateways, or servers may be provided between components of distributed system 100 depending upon a particular application or environment.

In an embodiment, enterprise server 140 includes a server database 145. Server database 145 may store any type of data, including, but not limited to, data to be used for analytics applications, that is accessible by enterprise server 140. Although only server database 145 is shown, additional databases may be used as necessary. In an embodiment, local database 115 is used to store data accessible by client device 110. For example, local database 115 may be implemented using any type of recording medium coupled to an integrated circuit that controls access to the recording medium. The recording medium can be, for example and without limitation, a semiconductor memory, a hard disk, or other similar type of memory or storage device. Moreover, local database 115 may be integrated within client device 110 or a standalone device communicatively coupled to client device 110 via a direct connection. For example, local database 115 may include an internal memory device of client device 110, a compact flash card, a secure digital (SD) flash memory card, or other similar type of memory device.

In an example, client device 110 may suffer from limitations such as reduced memory capabilities when compared to enterprise server 140. Therefore, data stored at local database 115 includes, but is not limited to, a subset of data found at server database 145. For example, local database 115 and server database 145 may each be relational databases. In an embodiment, the data stored at local database 115 can be synchronized with server database 145 over network 130. An example by which client device 110 can interact with enterprise server 140 to synchronize data is described in, but not limited to, commonly owned U.S. patent application Ser. No. 11/882,749, filed Aug. 3, 2007, titled "Unwired Enterprise Platform", which is herein incorporated by reference in its entirety. Additional means by which data may be provided to local database 115 would be apparent to a person skilled in the relevant art given this description.

III. VISUALIZING EXPRESSIONS FOR DYNAMIC ANALYTICS

Figure 2:
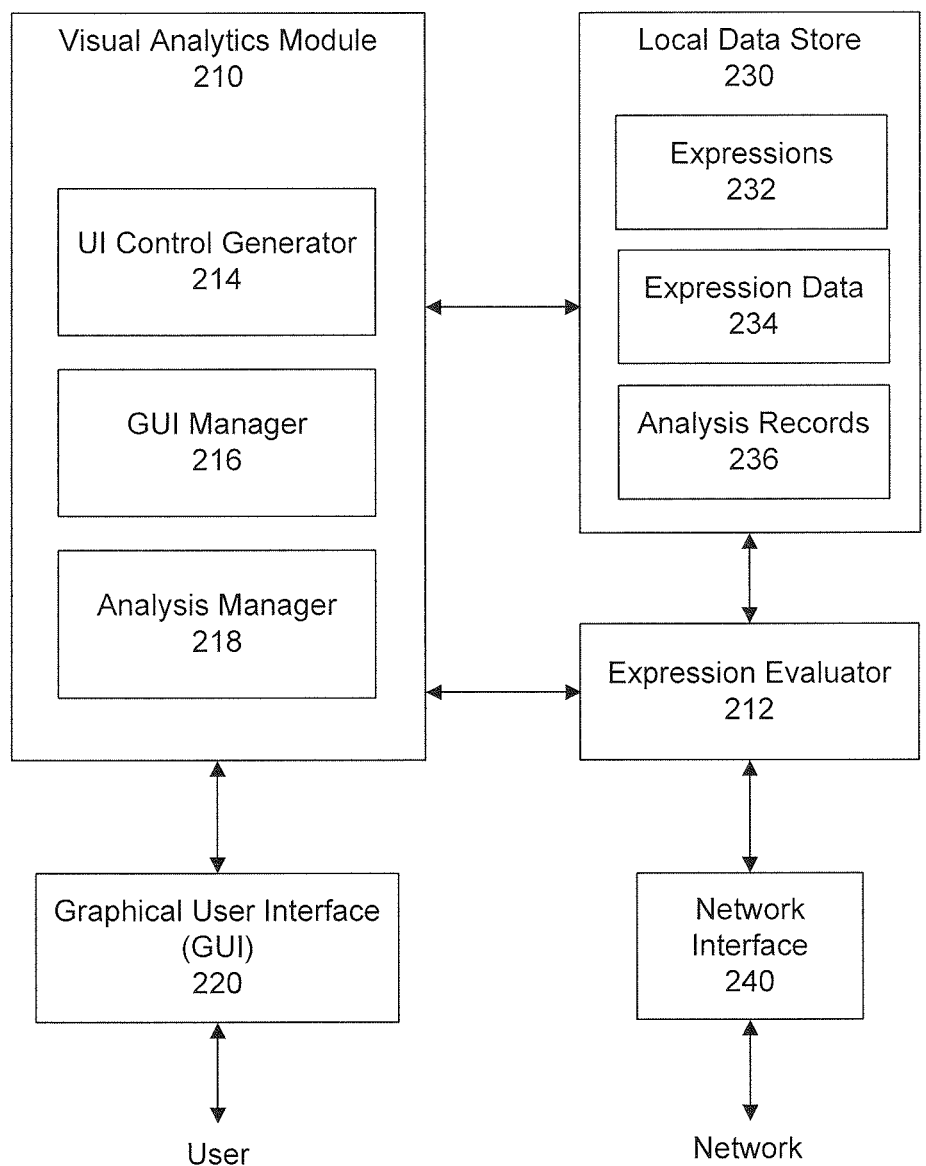
FIG. 2 is an architecture diagram of an exemplary device for visualizing expressions for dynamic analytics, according to an embodiment.

FIG. 2 is an architecture diagram of an exemplary device 200 for visualizing expressions, including expression variables, for dynamic analytics applications, according to an embodiment. Device 200 includes a visual analytics module 210, an expression evaluator 212, a user interface ("UI") control generator 214, a graphical user interface ("GUI") manager 216, an analysis manager 218, a GUI 220, a local data store 230, expressions 232, expression data 234, analysis records 236, and a network interface 240. For example, device 200 can be used to implement client device 110 of FIG. 1.

In an embodiment, device 200 executes a visual analytics module 210. In an embodiment, visual analytics module 210 includes UI control generator 214, GUI manager 216, and analysis manager 218. In a further embodiment, visual analytics module 210 is communicatively coupled to expression evaluator 212 and local data store 230 via an internal data bus of device 200. In an embodiment, local data store 230 is a lightweight database (e.g., local database 115 of FIG. 1) holding some subset of data from an enterprise server database (e.g., enterprise database 145 of FIG. 1).

In an embodiment, expression evaluator 212 is a mobile analytics expression engine as described in commonly owned U.S. patent application Ser. No. 12/632,963, entitled "Thing Analytics for Enterprise Mobile Users," which is incorporated by reference herein in its entirety. However, a person skilled in the relevant art would appreciate that other embodiments of expression evaluator 212 may be implemented using any one of various generic or specialized expression evaluators. In an embodiment, expression evaluator 212 uses network interface 240 to receive and update data stored at local data store 230 from the enterprise server over a network (e.g., network 130 of FIG. 1). In an example, local data store 230 may be configured to operate as a relational database, but is not intended to be limited thereto. A person skilled in the relevant art given this description will appreciate that local data store 230 may be configured using other data storage and retrieval mechanisms.

In an embodiment, local data store 230 includes expression 232, expression data 234, and analysis records 236. Expressions 232 may include, but are not limited to, mathematical expressions as well as prediction and statistical expressions. The aforementioned expressions are presented by way of example and not limitation. A person skilled in the relevant art given this description will appreciate that other types of expressions may be implemented as necessary. Expression data 234 may include, but is not limited to, persistent analytics application data and/or aggregated historical analytics application data, such as, for example, aggregated key performance indicators ("KPI"). In an embodiment, expression evaluator 212 uses network interface 240 to receive and update expressions 232 and/or expression data 234 from an enterprise server over a network, as described above. In an example, such expressions are predefined by an analytics application developer, and may be initially stored at an enterprise server and later retrieved via network interface 240 and stored at local data store 230.

In an embodiment, expression evaluator 212 accesses expression data 234 for evaluating expressions 232, according to an embodiment. For example, expression data 234 may comprise values for the variables of a particular expression included within expressions 232. In an embodiment, expression evaluator 212 uses expression data 234 to evaluate the expression from expressions 232 and generate a graphical representation of expressions 232 and expression data 234 based on the evaluation. In a further embodiment, the generated graphical representation is in the form of one or more charts. In addition, expression evaluator 216 is configured to display the generated graphical representation to a user at device 200 using GUI 220.

In an embodiment, UI control generator 214 analyzes the expression retrieved by expression evaluator 212 in order to generate graphical user interface controls (or simply "user interface controls" or "UI controls") for each of the variables of the expression. UI control generator 214 binds each variable of the expression to the corresponding user interface control. For example, UI control generator 214 may generate multiple slider controls that correspond to different expression variables containing, for example, integer data type values. In this example, UI control generator 214 binds the expression variables to its respective slider control.

As mentioned previously, the expressions and expression variables stored in expressions 232 are defined by an analytics application developer. In an embodiment, the definition of each expression variable includes various parameters. For example, such parameters may include, but are not limited to, a variable name, data type, metadata, and/or other parameters. Further, each variable may either be statically or dynamically bound or mapped to a particular user interface control. In an embodiment, the developer statically binds a variable with a user interface control by including the type of user interface control to generate in the definition of the variable. For example, the developer may specify a slider control within the definition of an expression variable. Thus, in this embodiment, UI control generator 214 identifies the type of UI control to generate from the definition of the variable itself.

In another embodiment, UI control generator 214 includes an internal mapping of variable data types to UI controls, in which each data type is mapped to a particular UI control. Such a variable data-type-to-control mapping may include, for example, a mapping of integer variables to slider controls, date variables to calendar or date selector controls, and Boolean variables to checkbox controls. Thus, in this embodiment, UI control generator 214, identifies the data type of the variable from its definition, automatically generates the appropriate UI control by using its internal mapping of data types to UI controls, and dynamically binds the variable with the generated UI control. Since the UI control for a variable is disassociated from the variable itself, dynamically binding the variable to a UI control offers application developers the flexibility to change the types of UI controls that can be generated for various data types without having to modify the variable itself.

As mentioned previously, in an embodiment, expression evaluator 212 generates and displays one or more graphical charts based on the evaluation of the expression, as described above. In an embodiment, GUI manager 216 uses GUI 220 to display the user interface controls generated by UI control generator 214. In an example discussed in further detail below, GUI 220 may be used to display a graphical view with two windows or content display areas, in which expression evaluator 212 displays the generated chart(s) in one window and GUI manager 216 displays the generated user interface controls in the other (see, e.g., FIGS. 3A-3C, which show an exemplary GUI 300 with a chart window 304 and UI control windows 308A-308C, respectively). Accordingly, GUI 220 can be used to present the user with a graphical view of expression data 234 that facilitates data analysis by the user.

The user at device 200 may interact with GUI 220 either directly or indirectly using a user input device (not shown) coupled to device 200. Such user input device includes, but is not limited to, a touch-screen, mouse, QWERTY keyboard, microphone, or a T9 keyboard. For example, the user input device may be a touch-screen and GUI 220 may be integrated with the touch-screen. Thus, in this example, the user can interact directly with GUI 220 by using finger gestures to manipulate user interface controls displayed on GUI 220.

By manipulating user interface controls displayed on GUI 220, the user can modify the values of the expression variables. In an embodiment, GUI manager 216 is configured to receive or detect user input from the user via GUI 220. GUI manager 216 thereby receives the changed values of the expression variables. In an embodiment, expression evaluator 212 reevaluates the expression based on the changed values. In a further embodiment, expression evaluator 212 updates GUI 220 based on the reevaluated expression. For example, expression evaluator 212 may generate new charts or update already generated charts and then display the new or updated charts in the chart window of GUI 220.

In an embodiment, GUI manager 216 may display a user option within GUI 220 that enables the user at device 200 to view additional specialized user interface controls. In response to selection of the user option by the user, UI control generator 214 generates one or more specialized user interface controls. Such specialized user interface controls may be bound to one or more expression variables by UI control generator 214 and therefore, allow the user to further control or modify the expression variables. Similar to the default user interface controls generated by UI control generator 214, the user can manipulate the specialized user interface controls using a user input device coupled to device 200, thereby further modifying or adjusting expression variables corresponding to the specialized user interface controls. GUI manager 216 receives any modifications or adjustments to expression variables based on user manipulation of the default user interface controls and/or the specialized user interface controls. As described above, expression evaluator 212 reevaluates the expression using the changed values and updates GUI 220 based on the reevaluated expression, according to an embodiment.

Figure 6:
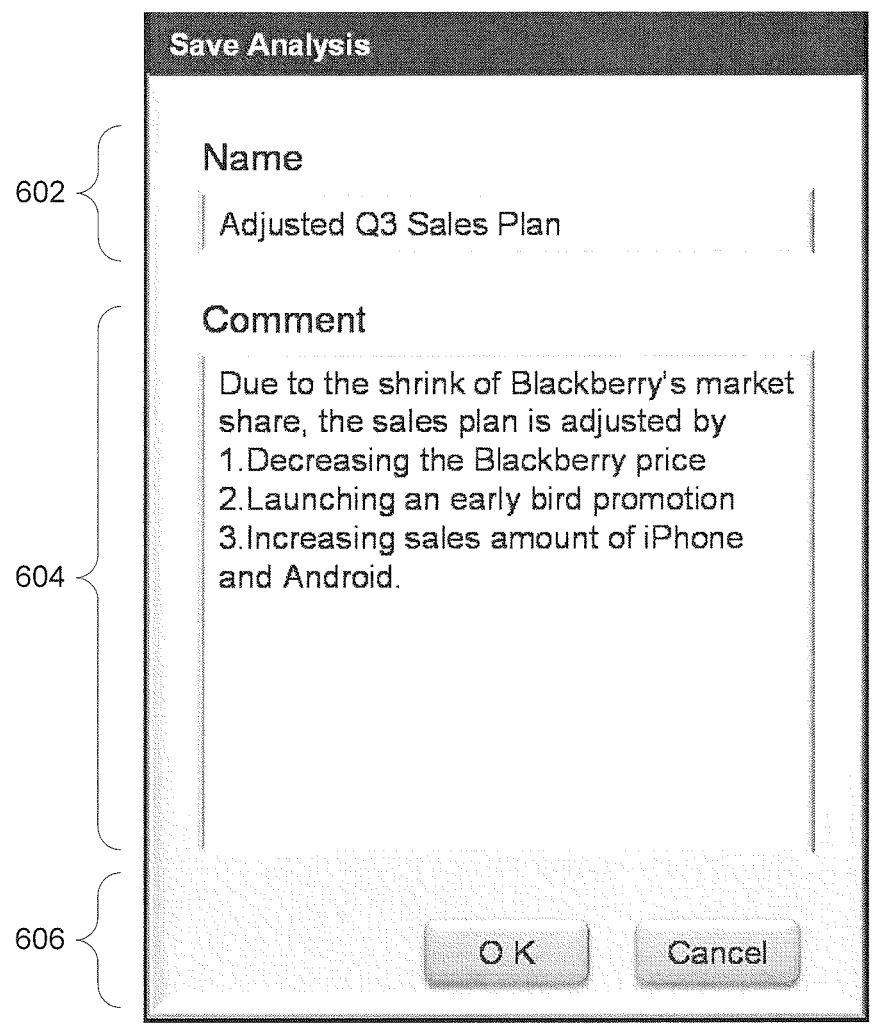
FIG. 6 is an illustration of an exemplary graphical user interface displaying an option to save user adjustments to expression variables, according to an embodiment.

Using the graphical view of analytics or expression data in combination with the user interface controls in GUI 220, the user can perform an analysis of the data in an easy and efficient manner. In an embodiment, analysis manager 218 allows the user to select an option to save a performed analysis after adjusting expression variables as desired. For example, the user may analyze the data using the user interface controls displayed on GUI 220 to adjust expression variables in order to produce a desired result of the expression evaluation. This analysis, including the adjusted variables, may then be saved by the user by selecting a "Save" button that is displayed in GUI 220. In response to the selection of the "Save" button, GUI manager 216 can display a separate save view, form, or window in GUI 220 that includes one or more data fields, which allow the user to provide a name for the analysis and optional comments describing the adjustments that were made (see, e.g., FIG. 6, which shows an exemplary GUI displaying an option to save user adjustments to expression variables). In an embodiment, variable adjustments saved by the user are stored in local data store 230 as analysis records 236.

Figure 7:
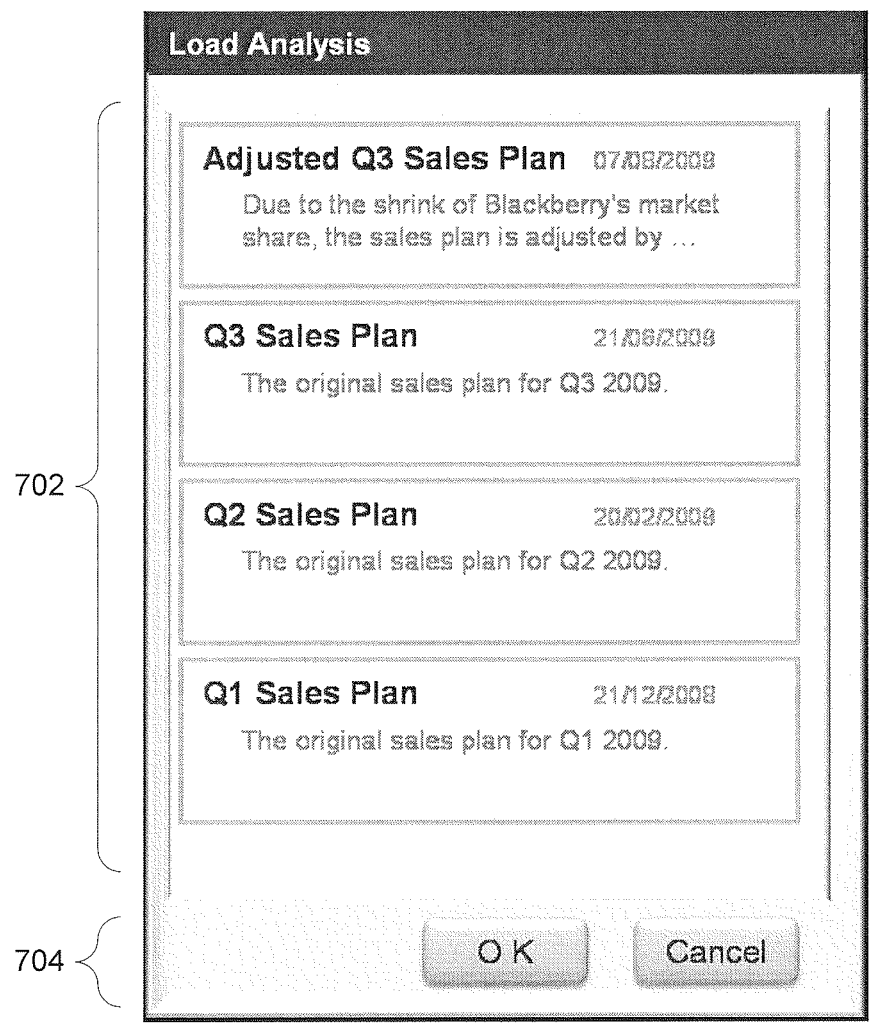
FIG. 7 is an illustration of an exemplary graphical user interface displaying an option to load previously saved expression variable adjustments, according to an embodiment.

In a further embodiment, analysis manager 218 enables the user to select an option to load a previously saved analysis, including adjusted expression variables, as described above. Analysis manager 218 accesses saved analyses, including expression variable adjustments, by retrieving analysis records 236 from local data store 230. For example, the user may select a "Load" button displayed in GUI 220, in response to which GUI manager 216 can display a separate load view, form, or window using GUI 220. For example, GUI manager 216 may display previously saved analyses, retrieved by analysis manager 218, in list form, sorted by name (see, e.g., FIG. 7, which shows an exemplary GUI displaying an option to load previously saved expression variable adjustments).

Visual analytics module 210 and its components (UI control generator 214, GUI manager 216, and analysis manager 218) in addition to expression evaluator 212 can be implemented in software, firmware, hardware, or any combination thereof. Embodiments of visual analytics module 210, expression evaluator 212, UI control generator 214, GUI manager 216, and analysis manager 218, or portions thereof, can also be implemented to run on any type of computing device. Such computing device can include, but is not limited to, a personal computer, mobile device such as a mobile phone, workstation, embedded system, game console, television, set-top box, or any other computing device capable of carrying out the functionality described herein.

Further, such computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

IV. SALES PLANNING EXAMPLE FOR VISUALIZING DYNAMIC ANALYTICS

An example dynamic analytics application for which visualizing expression variables would be particularly advantageous for enterprise mobile users is a sales planning analytics application. FIGS. 3A-7 will be used to illustrate the sales planning analytics example. In this example, a user, such as a sales manager, can use dynamic analytics to help adjust sales plans in order to meet sales targets. A sales team generally has revenue and profit targets for each fiscal quarter. A sales plan is created to achieve these targets. Additionally, the sales team may also try to sell all of the inventory in each quarter. It should be noted that this example is presented for explanatory purposes only, and embodiments are not intended to be limited thereto. A person skilled in the relevant art given this description will appreciate that a system for visualizing dynamic analytics, as described above, could be applied to other types of analytics applications.

A. Visualizing Expression Variables for Sales Products

Figure 3C:
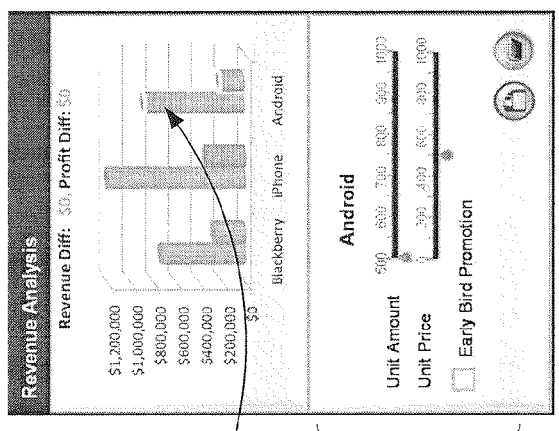
FIG. 3C is an illustration of the exemplary graphical user interface displaying a graphical view of sales data and expression variables visualized as user interface controls for a third of the three sales products, according to an embodiment.
Figure 3B:
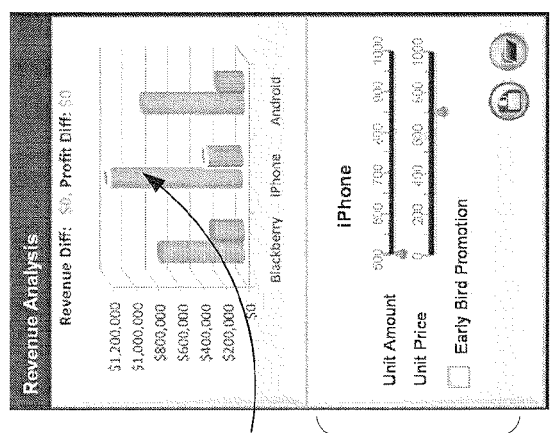
FIG. 3B is an illustration of the exemplary graphical user interface displaying a graphical view of sales data and expression variables visualized as user interface controls for a second of the three sales products, according to an embodiment.
Figure 3A:
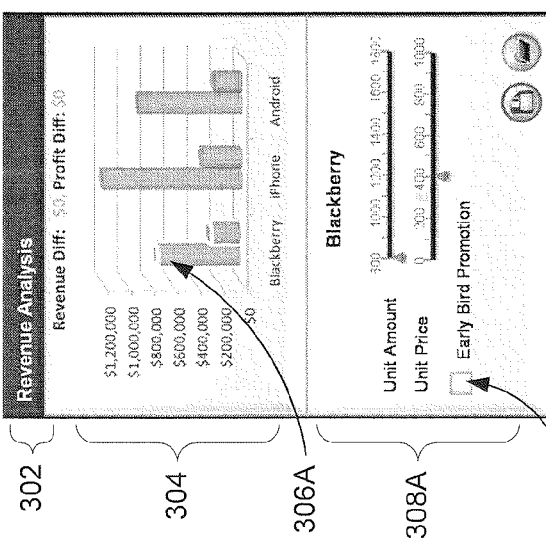
FIG. 3A is an illustration of an exemplary graphical user interface displaying a graphical view of sales data and expression variables visualized as user interface controls for a first of three sales products, according to an embodiment.

FIGS. 3A-3C illustrate an exemplary graphical user interface ("GUI") 300 displaying expression variables visualized as user interface controls for each of three different sales products, according to an embodiment. For ease of explanation, the operation of GUI 300 is discussed in the context of a mobile device platform with a touch-screen, but is not intended to be limited thereto. Examples of such mobile device platforms include, but are not limited to: the Windows Mobile from the Microsoft Corporation; the iOS or iPhone OS from Apple, Inc.; Android from Google Inc.; and Blackberry from Research In Motion ("RIM"). For example, GUI 220 of FIG. 2 may be used to implement GUI 300. Further, device 200 of FIG. 2 may be used to implement the mobile device in this example.

GUI 300 shows the main screen of an application used to display sales data, in accordance with an embodiment of the present invention. For example, a sales manager in the field may have a mobile device running GUI 300 to provide data requested by a potential client almost instantly and in real time. A sales graph summary is displayed in chart view 304 where sales data is presented in graphical form, in accordance with an embodiment. One skilled in the relevant arts will appreciate that the use of sales data, and particularly sales data corresponding to "Blackberry," "iPhone," and "Android" products are presented by way of example, and not limitation, and the principles described herein can be applied to a vast range of data available to the analytics application.

As illustrated in FIGS. 3A-3C, GUI 300 includes a title bar 302, a chart view 304, user interface ("UI") control views 308A-308C, respectively, and checkbox 310, according to an embodiment. Title bar 302 is used to display the context of the analytics information displayed in GUI 300. For example, GUI 300 displays "Revenue Analysis" in title bar 302 to denote that the content displayed in chart view 304 and UI control views 308A-308C corresponds to an analysis of revenue data. Chart view 304 presents a chart showing the expected revenue and profit for each of three sales products. Chart view 304 includes a title showing the difference of revenue and profit between the expected and target values.

Figure 5B:
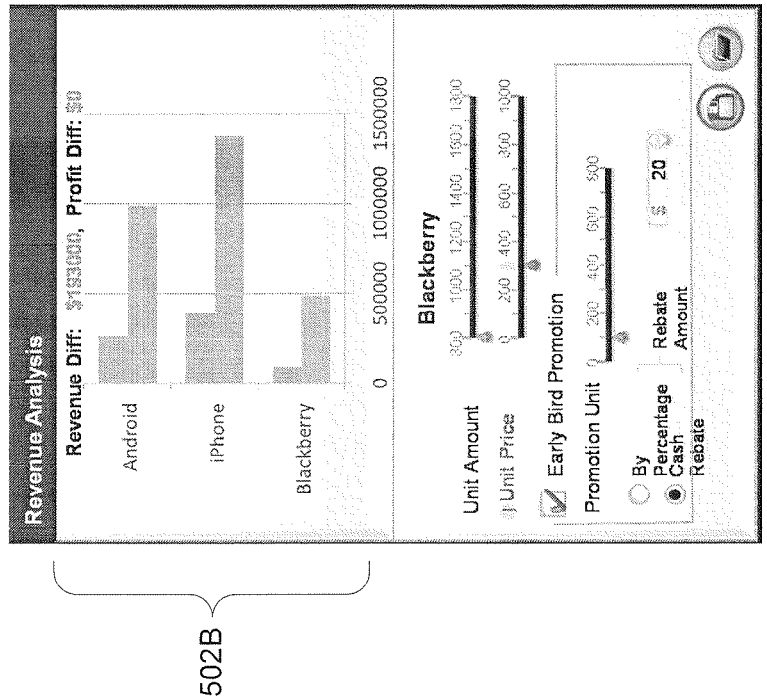
FIG. 5B is an illustration of the exemplary graphical user interface displaying a graphical view of a data in the form of a horizontally oriented bar chart, according to an embodiment.
Figure 5A:
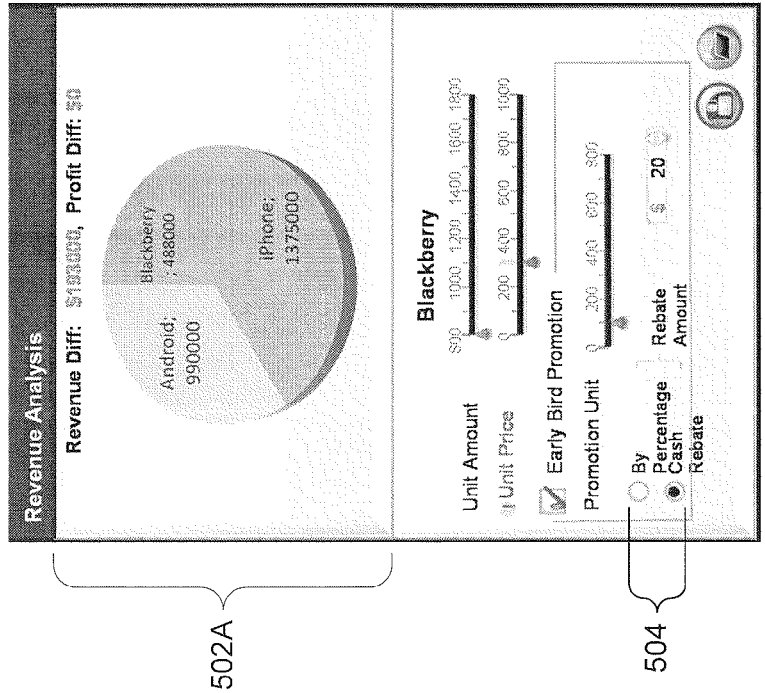
FIG. 5A is an illustration of an exemplary graphical user interface displaying a graphical view of a data in the form of a pie chart, according to an embodiment.

In an embodiment, it is possible, if the user desires, to change the view of the chart displayed in chart view 304. This allows the user to, for example, change the data view from a bar graph to a pie chart. FIG. 5A shows an exemplary GUI 500 displaying a graphical view of a data in the form of a pie chart, according to an embodiment. In another example, the user can change the orientation of the bar chart to be horizontal. FIG. 5B shows GUI 500 displaying a graphical view of a data in the form of a horizontally oriented bar chart, according to an embodiment. It would be apparent to a person skilled in the relevant art given this description that additional user interface elements (e.g., a menu or drop-down list) or windows may be displayed in GUI 300 that enable the user to switch from one graphical view of the data to another.

Referring back to FIGS. 3A-3C, the user can select a particular product by selecting the product in chart view 304. The user can select a product using a user input device, such as a touch-screen. For example, the user may select the Blackberry product by tapping the touch-screen used to display GUI 300 on a mobile device. When a product is selected in chart view 304, the UI controls for the selected product are displayed in the bottom half of GUI 300. Thus, UI control view 308A shown in FIG. 3A is displayed if the user selects the portion of chart view 304 (e.g., data bars 306A) corresponding to the Blackberry product, UI control view 308B shown in FIG. 3B is displayed if the user selects the portion of chart view 304 (e.g., data bars 306B) corresponding to the iPhone product, and UI control view 308C shown in FIG. 3C is displayed if the user selects the portion of chart view 304 (e.g., data bars 306C) corresponding to the Android product. For each product, the user may adjust the unit amount to sell in the remainder of the fiscal quarter or adjust the unit price by using the slider controls in UI control views 308A-308C. In addition, the user may launch a sales promotion by selecting checkbox 310 labeled "Early Bird Promotion."

In this example, the relevant expression used for the analysis is relatively simple: revenue=unit amount×unit price. Although the expression presented in this example is a simple expression, embodiments are not limited thereto. A person skilled in the relevant art given this description would appreciate that more complex expressions may be used as necessary. Thus, the variables in this expression are "unit amount" and "unit price." In order to provide a way for the user in this example to modify this expression without having to edit the actual syntax of the expression, these expression variables are visualized or graphically presented as user interface controls, particularly as slider controls.

Referring back to FIG. 2, the expression used in this example can be stored in local data store 230 as expressions 232 and evaluated by expression evaluator 212 using expression data 234, according to an embodiment. In an embodiment, UI control generator 214 generates a slider control for each of the two variables (i.e., unit price and unit amount) of the expression. UI control generator 214 also binds the variables to the generated controls so that the user can manipulate the slider controls to change or adjust the values of each variable as desired. In an embodiment, in response to the adjustment of values by the user, expression evaluator 212 reevaluates the expression using the adjusted values and generates a new chart that reflects the adjusted values and reevaluated expression for the selected product. The new chart is then displayed, in real time, by expression evaluator 212 in chart view 304.

B. Enabling Sales Promotions

Figure 4:
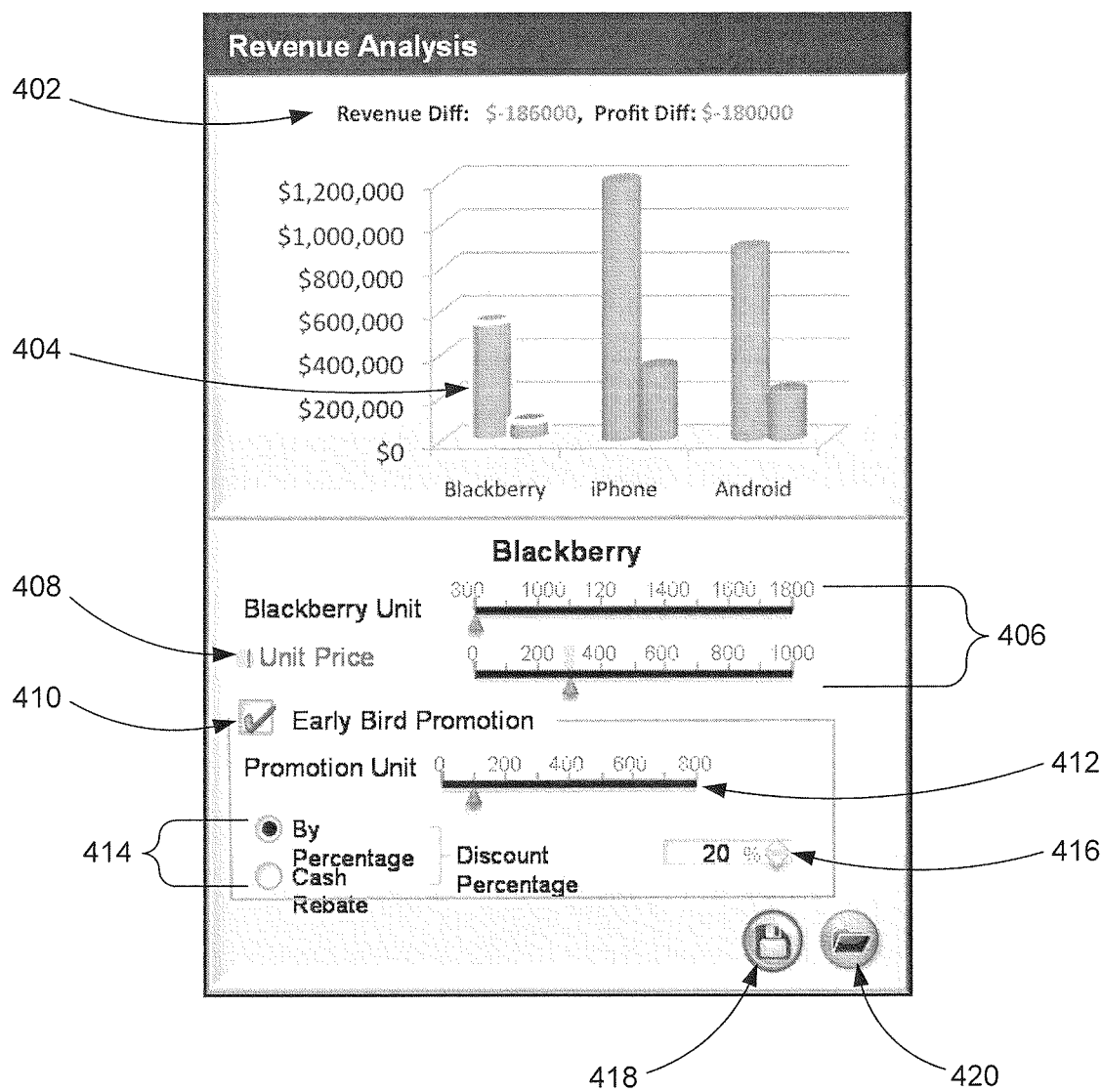
FIG. 4 is an illustration of an exemplary graphical user interface displaying a graphical view of sales data, default user interface controls representing visualized expression variables, and additional user interface controls, according to an embodiment.

FIG. 4 is an illustration of an exemplary non-limiting GUI 400 displaying a GUI after the user has enabled a sales promotion, according to an embodiment. GUI 400 displays a graphical chart view of the sales data, and includes a title 402 showing the current difference of revenue and profit between the expected and target values. GUI 400 also displays the default user interface controls 406 representing visualized expression variables, as illustrated in GUI 300 of FIG. 3A, in addition to specialized user interface controls 412, 414, and 416 associated with the sales promotion. As illustrated in FIG. 4, the current sales product in focus for analysis by the user is the Blackberry product. For example, data bars 404 corresponding to the Blackberry product in the current chart view of GUI 400 may be highlighted in GUI 400 to show the current focus.

As described above, the user may select checkbox 310 of FIG. 3A to launch a sales promotion for one or all of the three products. Checkbox 410 shows the checkbox after the user has selected it to launch the sales promotion. Specialized user interface controls 412, 414, and 416, which are associated with the promotion, are displayed in the UI control view portion of GUI 400. For example, as illustrated in GUI 400, UI control 412 may be a slider control that can be used to adjust the number of products to be sold in the promotion and UI control 414 is a set of radio button controls that can be used to adjust the type of promotion (e.g., percentage discount or cash rebate). In addition, UI control 416 may be a data selection box with arrows that can be used to adjust detailed parameters of each promotion type. As shown in GUI 400, UI control 416 can be used to adjust the discount percentage for a percentage-based promotion. In an embodiment, GUI manager 216 of FIG. 2 can be used to update GUI 400 in order to display the specialized user interface controls 412, 414, and 416 in addition to UI controls 406, as described above.

Thus, the user can use the default UI controls 406 in combination with UI controls 412, 414, and 416 to further adjust the variables of the expression as desired in order to perform a revenue analysis on the sales data. For example, the user may decrease the unit price by selecting the "Unit Price" slider of UI controls 406. In an embodiment, a warning 408 is displayed in GUI 400 if the result of the expression is evaluated (e.g., by using expression evaluator 212 of FIG. 2) to produce a revenue value for product sales that would not result in a profit. Upon viewing warning 408, the user may then launch the promotion by selecting checkbox 410, and then adjust the additional UI controls related to the promotion. In a further example, the user may adjust variables (i.e., by adjusting UI controls in GUI 400 representing the variables) for the other products in order to compensate for any losses attributed to a single product.

The particular user interface controls related to the promotion are described herein by way of example, and not limitation. It would be apparent to a person skilled in the relevant art given this description that different types of controls may be employed in different ways as necessary depending on a particular application. It would also be apparent to a person skilled in the relevant art given this description that more or less user interface elements may be employed in GUI 400 as necessary.

In an embodiment, the user can also save an analysis after adjusting the variables using the UI controls by selecting, for example, button 418. In a further embodiment, the user can load previously saved analyses by selecting, for example, button 420. The saving and loading operations may be performed by, for example, analysis manager 218 of FIG. 2, as described above.

V. METHOD

A. User Process for Viewing and Modifying Visualized Expression Variables

Figure 8:
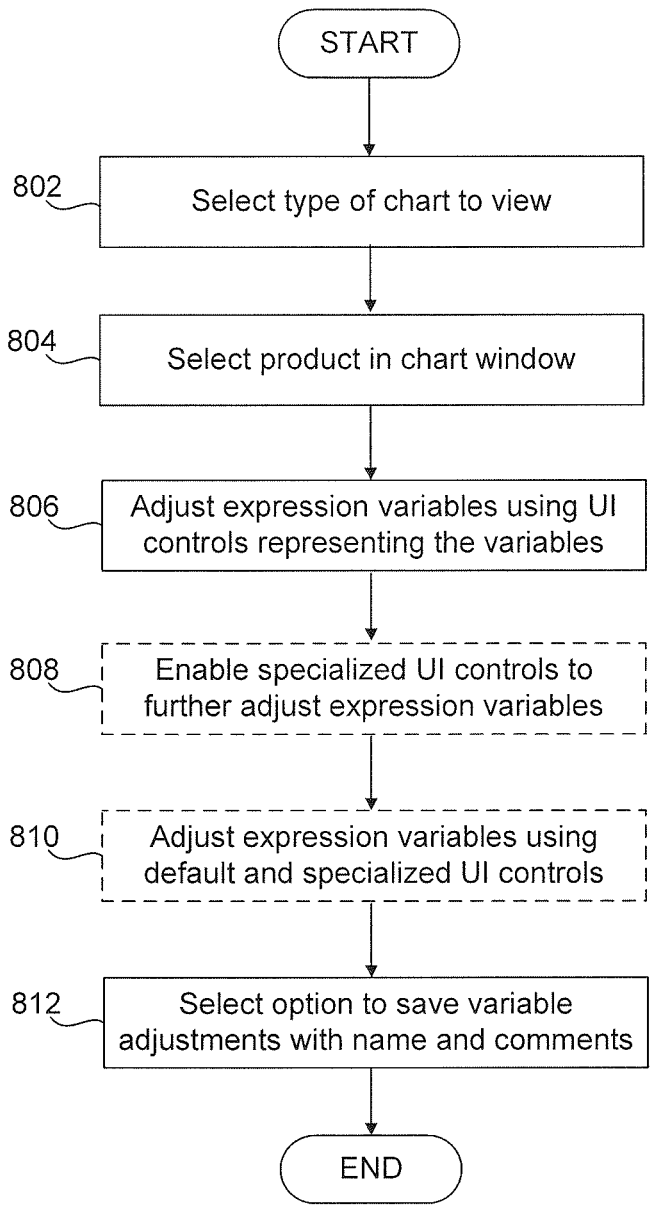
FIG. 8 is a process flow chart of an exemplary method by which a user is able to view and modify variables of an expression, according to an embodiment.

FIG. 8 is a process flow chart of an exemplary method 800 by which a user is able to view and modify variables of an expression, according to an embodiment. Method 800 includes steps 802, 804, 806, 808, 810, and 812. Benefits of method 800 include providing an easier, more efficient, and more user-friendly experience for users who are able to modify expressions for dynamic analytics without having to edit the actual syntax of the expressions. For ease of explanation, method 800 will be described in the context of the sales planning example described above, but is not intended to be limited thereto. Thus, in this non-limiting example, the user may be a sales manager in the field who is using a visualized dynamic analytics application on a mobile device to view and analyze sales data.

Method 800 starts in step 802, which includes selecting the type of chart to view. As described above, a graphical view of sales data in the form of a chart is displayed in the GUI of the mobile device. The user can switch between different chart types (e.g., from a bar chart, as illustrated in GUI 300 of FIG. 3, to a pie chart, as illustrated in GUI 500 of FIG. 5A). It would be apparent to a person skilled in the relevant art given this description that additional user interface elements, such as a menu or drop-down list control, may be provided in the GUI enabling the user to switch between the different chart types.

Method 800 then proceeds to step 804, in which a product is selected by, for example, touching the portion of the chart view corresponding to the product. When a product is selected, the expression associated with the product (e.g., stored in expressions 232 of local data store 230 of FIG. 2) is evaluated using sales data associated with the product (e.g., stored in expression data 234 of local data store 230) and the variables of the expression are visualized or graphically displayed as UI controls in the GUI.

There may be one or several expressions associated with any given product. For example, an application developer may configure the analytics application running on the user's device to have either one or multiple expressions for the analysis of a product. In an embodiment, for multiple expressions (e.g., stored in expressions 232), the user is provided an option to select the desired expression to use for the analysis. For example, a scrollable list containing various expressions associated with a product may be displayed in the GUI, and the user may select an expression from the list. Additional well-known methods for displaying available expressions and enabling the user to select any of them would be apparent to a person skilled in the relevant art given this description. Once an expression has been selected and variables of the expression are visualized as UI controls and displayed in the GUI, method 800 can proceed to step 806.

In step 806, the user can adjust the expression variables by manipulating the displayed UI controls representing the variables, as described above. Steps 808 and 810 are optional steps that may correspond to, for example, launching a sales promotion as described above. For example, in step 808, additional UI controls that relate to the promotion are enabled (and thus, displayed in the GUI), and in step 810, the user adjusts the additional UI controls to adjust the parameters of the promotion. Method 800 ends in step 812, which includes the user selecting a save option to save the analysis or adjustments made. The analysis/variable adjustments may be saved with a name. In addition, comments describing the adjustments may be included, as desired by the user.

Thus, method 800 shows the facilities provided by visualizing expression variables in such a dynamic analytics scenario may therefore be useful to a developer wishing to present data customized to the nuances of this user. In accordance with an embodiment, a developer could use, for example, UI control generator 214 of FIG. 2, to generate UI controls and bind expression variables to the generated controls.

As described above, the developer defines the expression and its variables. The definition of each variable may include, for example, a variable name, data type, metadata, and other parameters. Also as described above, each variable may either be statically or dynamically bound or mapped to a particular UI control. Thus, in the sales planning example, the developer may statically bind the unit amount and unit price expression variables to slider controls by specifying a slider control in each of the definitions of the unit amount and unit price expression variables. In an example of dynamic binding, UI control generator 214 may include an internal mapping that maps integer variable types to slider controls. Thus, in the sales planning example, since unit amount and unit price are variables having integer data types, UI control generator 214 dynamically generates a slider control for each of the unit amount and unit price variables and binds the variables with the generated slider controls.

The advantage of visualizing expression variables as user interface controls displayed on a GUI becomes apparent in practical applications of dynamic analytics. For example, a busy sales manager may not have the knowledge of expression syntax or the time to edit such syntax. Therefore, by using visualized dynamic analytics, the sales manager can quickly analyze sales data using the chart views and UI controls as described above. In accordance with an embodiment, the sales data, expression, and other information (e.g., information related to user interface elements) related to respective products and/or other selectable objects of interest to users can be pushed to a mobile device from an enterprise server during a synchronization operation, such that a developer can rapidly anticipate and prepare expressions as they are needed by an end-user. All the end-user needs to do is to take advantage of the expressions is to select the appropriate product as in step 804.

B. Visualizing Expressions for Dynamic Analytics

Figure 9:
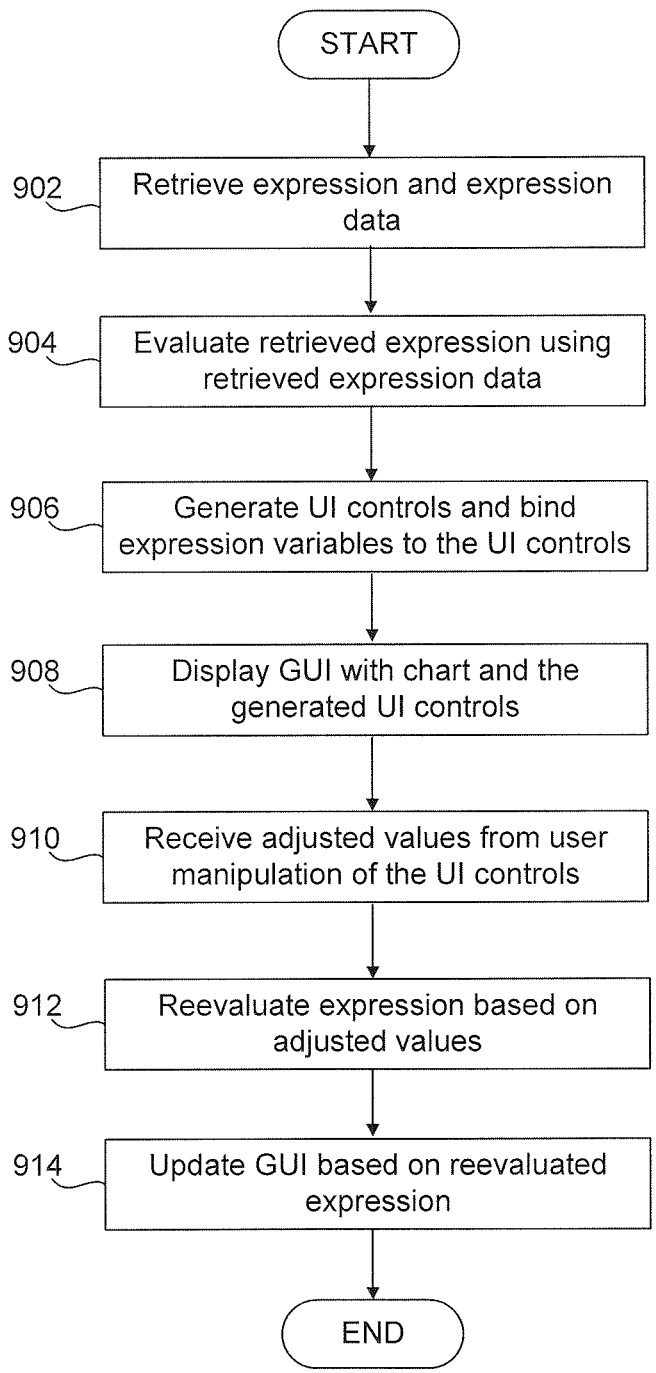
FIG. 9 is a process flow chart of an exemplary method for visualizing expressions for dynamic analytics, according to an embodiment.

FIG. 9 is a process flow chart of an exemplary method 900 for visualizing expressions for dynamic analytics, according to an embodiment. Method 900 includes steps 902, 904, 906, 908, 910, 912, and 914. For ease of explanation, system 100 of FIG. 1, as described above, will be used to describe method 900, but is not intended to be limited thereto. Further, for ease of explanation, method 900 will be described in the context of device 200 of FIG. 2, as described above. Based on the description herein, a person of ordinary skill in the relevant art will recognize that method 900 can be executed on other types of client devices such as, for example and without limitation, a PDA, a laptop or personal computer, and similar types of devices. These other types of client devices are within the scope and spirit of the embodiments described herein.

Method 900 begin in step 902, which includes retrieving an expression and stored expression data. In step 904, the retrieved expression is evaluated using the retrieved expression data. Steps 902 and 904 may be performed by, for example, expression evaluator 212. In addition, the expression and expression data may be stored at and retrieved from local data store 230. In an embodiment, the stored expression and expression data corresponds to one or more products (e.g., sales products that can be analyzed for a sales plan, as described in the sales planning example above). However, in other embodiments, expressions 232 and expression data 234 can correspond to any other user-selectable object of interest to users. Once the expression has been evaluated, method 900 proceeds to step 906, which includes generating user interface ("UI") controls for each variable of the expression retrieved in step 902 and binding the expression variables to the corresponding UI control. Step 906 may be performed by, for example, UI control generator 214. In an embodiment, additional UI controls may be generated (e.g., controls related a sales promotion as described in the sales planning example above).

Method 900 then proceeds to step 908, which includes displaying a graphical user interface ("GUI") (e.g., GUI 220) that presents to the user a graphical view of the expression data. The graphical view includes a chart view and the UI controls generated in step 906. In an embodiment, the user can select the type of chart to view, as described above. Thus, step 908 may also include receiving an option from the user to change the type of chart that is displayed in the GUI. Step 908 may be performed by, for example, expression evaluator 212. As described above, a user at the device can adjust values of the expression variables by manipulating the UI controls displayed in the GUI. In step 910, the adjusted values are received. Step 910 may be performed by, for example, GUI manager 216.

In response to receiving adjusted values of the expression variables, the expression is reevaluated based on the adjusted values in step 912. Step 912 may be performed by, for example, expression evaluator 212. Method 900 ends after step 914, which includes updating the GUI based on the reevaluated expression. The updating in step 914 is performed immediately, and substantially in real time, once the expression variables are adjusted by the user using the user interface controls. Step 914 may be performed by, for example, expression evaluator 212.

Although not shown in method 900, method 900 may include additional steps for saving adjustments to expression variables, for example, in expression data 234 of local data store 230, and loading previously saved adjustments, as described above, according to an embodiment. Such saving and loading steps may be performed by, for example, analysis manager 218.

Benefits of method 900 include graphically presenting or visualizing analytics expressions so that users are able to modify expression variables without exposing expression syntax. By not exposing expression syntax, semantic and syntax errors, associated with direct user-modification of expression syntax, can be prevented.

VI. EXAMPLE COMPUTER SYSTEM IMPLEMENTATION

Embodiments shown in FIGS. 1-9, or any part(s) or function(s) thereof, may be implemented using hardware, software modules, firmware, tangible computer readable media having instructions stored thereon, or a combination thereof and may be implemented in one or more computer systems or other processing systems.

Figure 10:
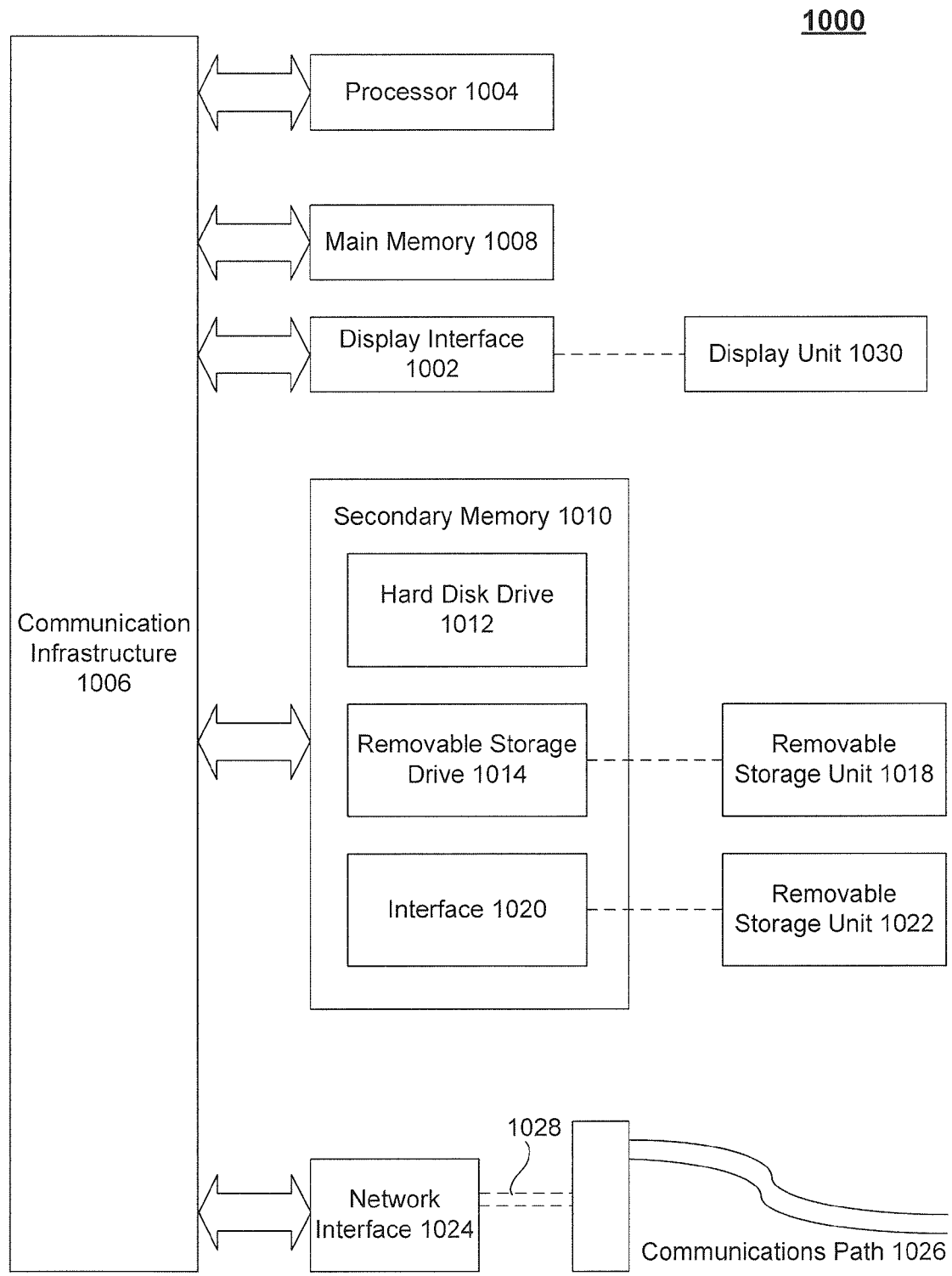
FIG. 10 is a diagram of an example computer system in which embodiments can be implemented.

FIG. 10 illustrates an example computer system 1000 in which embodiments, or portions thereof, may be implemented as computer-readable code. For example, client device 110 in FIG. 1 and device 200 of FIG. 2, can be implemented in computer system 1000 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-9.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in teams of this example computer system 1000. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1004 may be a special purpose or a general purpose processor device. As will be appreciated by persons skilled in the relevant art, processor device 1004 may also be a single processor in a multi-core/multiprocessor system, such system operating alone, or in a cluster of computing devices operating in a cluster or server farm. Processor device 1004 is connected to a communication infrastructure 1006, for example, a bus, message queue, network, or multi-core message-passing scheme.

Computer system 1000 also includes a main memory 1008, for example, random access memory (RAM), and may also include a secondary memory 1010. Secondary memory 1010 may include, for example, a hard disk drive 1012, removable storage drive 1014. Removable storage drive 1014 may comprise a floppy disk drive, a magnetic tape drive, an optical disk drive, a flash memory, or the like. The removable storage drive 1014 reads from and/or writes to a removable storage unit 1018 in a well known manner. Removable storage unit 1018 may comprise a floppy disk, magnetic tape, optical disk, etc. which is read by and written to by removable storage drive 1014. As will be appreciated by persons skilled in the relevant art, removable storage unit 1018 includes a computer usable storage medium having stored therein computer software and/or data.

In alternative implementations, secondary memory 1010 may include other similar means for allowing computer programs or other instructions to be loaded into computer system 1000. Such means may include, for example, a removable storage unit 1022 and an interface 1020. Examples of such means may include a program cartridge and cartridge interface (such as that found in video game devices), a removable memory chip (such as an EPROM, or PROM) and associated socket, and other removable storage units 1022 and interfaces 1020 which allow software and data to be transferred from the removable storage unit 1022 to computer system 1000.

Computer system 1000 may also include a communications interface 1024. Communications interface 1024 allows software and data to be transferred between computer system 1000 and external devices. Communications interface 1024 may include a modem, a network interface (such as an Ethernet card), a communications port, a PCMCIA slot and card, or the like. Software and data transferred via communications interface 1024 may be in the form of signals, which may be electronic, electromagnetic, optical, or other signals capable of being received by communications interface 1024. These signals may be provided to communications interface 1024 via a communications path 1026. Communications path 1026 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1018, removable storage unit 1022, and a hard disk installed in hard disk drive 1012. Computer program medium and computer usable medium may also refer to memories, such as main memory 1008 and secondary memory 1010, which may be memory semiconductors (e.g. DRAMs, etc.).

Computer programs (also called computer control logic) are stored in main memory 1008 and/or secondary memory 1010. Computer programs may also be received via communications interface 1024. Such computer programs, when executed, enable computer system 1000 to implement the present invention as discussed herein. In particular, the computer programs, when executed, enable processor device 1004 to implement the processes of embodiments described herein, such as the stages in the methods illustrated by flowcharts 800 and 900 of FIGS. 8 and 9, respectively, discussed above. Accordingly, such computer programs represent controllers of the computer system 1000. Where the invention is implemented using software, the software may be stored in a computer program product and loaded into computer system 1000 using removable storage drive 1014, interface 1020, and hard disk drive 1012, or communications interface 1024.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

VII. CONCLUSION

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for visualizing expressions for dynamic analytics, comprising:

evaluating an expression having a plurality of variables using expression data corresponding to the variables;

generating graphical user interface controls for the variables of the expression;

binding each variable of the expression to one or more graphical user interface controls generated in the generating step;

graphically displaying the bound graphical user interface controls for the variables of the expression;

receiving from a user an adjusted value of at least one of the variables, the user having adjusted said at least one of the variables using one or more of the bound graphical user interface controls;

re-evaluating the expression using the adjusted value of the at least one of the variables;

receiving, from the user, an indication to further adjust a particular one of the plurality of the variables of the expression based on an additional variable to the expression, wherein the additional variable is not one of the evaluated plurality of variables of the expression; and graphically displaying, responsive to receiving the indication, an additional user interface control corresponding to the additional variable, wherein an adjustment of the additional variable using the additional user interface control changes a value of the particular variable of the expression, wherein both the additional user interface control and the additional variable were unavailable prior to receiving the indication, and wherein the plurality of variables of the expression remain operable independent of the additional user interface control of the additional variable.

2. The method of claim 1, wherein the evaluating comprises:
retrieving the expression data corresponding to the variables; and
evaluating the expression using the retrieved expression data.

3. The method of claim 1, wherein the generating comprises generating the graphical user interface controls for the variables of the expression based on a definition of each of the variables, wherein the definition includes a type of graphical user interface control.

4. The method of claim 1, wherein the generating comprises generating the graphical user interface controls for the variables of the expression based on a data type of each of the variables.

5. The method of claim 1, wherein the graphically displaying further comprises: displaying a graphical view of the expression data based on the evaluating of the expression.

6. The method of claim 5, further comprising:
updating the displayed graphical view based on the reevaluating of the expression using the adjusted value of the at least one of the variables.

7. The method of claim 5, wherein the graphical view is displayed as a chart.

8. The method of claim 7, further comprising:
enabling the user to specify a chart type, wherein the chart is displayed according to the specified chart type.

9. The method of claim 1, further comprising:
enabling the user to select an option to save the adjusted value of the at least one of the variables of the expression;
receiving, from the user, the selected option to save the adjusted value of the at least one of the variables;
graphically displaying a save form in response to receiving the selected option to save, the save form including one or more data fields, wherein the one or more fields are configured to receive information associated with the adjusted value of the at least one of the variables from the user; and
saving the adjusted value of the at least one of the variables and the associated information entered by the user.

10. The method of claim 9, further comprising:
enabling the user to select an option to load one of a plurality of previously saved adjusted values of the at least one of the variables of the expression;
receiving, from the user, the selected option to load the one of the plurality of previously saved adjusted values;
graphically displaying a load form in response to receiving the selected option to load, the load form including a list of the plurality of previously saved adjusted values, wherein the user may select the one of the plurality of previously saved adjusted values from the list; and
loading the one of the previously saved adjusted values selected by the user from the list.

11. The method of claim 1, wherein the value of the additional variable is not allowed to exceed the value of the particular variable.

12. The method of claim 11, further comprising:
re-evaluating the expression based on an adjustment to the additional variable via the additional user interface control;
determining a difference between a value of the expression prior to the adjustment to the additional variable and a value of the expression after the re-evaluation based on the adjustment; and
graphically displaying the difference.

13. The method of claim 12, further comprising:
determining based on either the re-evaluating the expression using the adjusted value of the at least one of the variables or the re-evaluating the expression based on an adjustment to the additional variable that the value of the expression after the re-evaluation exceeds a threshold; and
graphically displaying a notification to the user that the threshold has been exceeded.

14. The method of claim 13, wherein the threshold is a profit threshold, and the particular variable is a sales price of a product, and the additional variable is a discounted sales price of the product.

15. A system for visualizing expressions for dynamic analytics, comprising:
an expression evaluator implemented on a computing device including at least one processor, that when executed by the at least one processor, evaluates an expression having a plurality of variables using expression data corresponding to the variables;
a UI control generator configured to generate one or more graphical user interface controls for the variables of the expression, and to bind each variable of the expression to the one or more generated graphical user interface controls;
a GUI manager configured to graphically display the bound graphical user interface controls for the variables of the expression, and to receive from a user an adjusted value of at least one of the variables, the user having adjusted said at least one of the variables using at least one of the bound graphical user interface controls, wherein the expression evaluator is further configured to re-evaluate the expression using the adjusted value of the at least one of the variables, and receive, from the user, an indication to further adjust a particular one of the plurality of the variables of the expression based on an additional variable to the expression, wherein the additional variable is not one of the evaluated plurality of variables of the expression; and
a display module configured to graphically display, responsive to receiving the indication, an additional user interface control corresponding to the additional variable, wherein an adjustment of the additional variable using the additional user interface control changes a value of the particular variable of the expression, wherein both the additional user interface control and the additional variable were unavailable prior to receiving the indication, and wherein the plurality of variables of the expression remain operable independent of the additional user interface control of the additional variable.

16. The system of claim 15, wherein the expression evaluator is configured to retrieve the expression data corresponding to the variables, and further configured to evaluate the expression using the retrieved expression data.

17. The system of claim 15, wherein the UI control generator is configured to generate the graphical user interface controls for the variables of the expression based on a definition of each of the variables, wherein the definition includes a type of graphical user interface control.

18. The system of claim 15, wherein the UI control generator is configured to generate the graphical user interface controls for the variables of the expression based on a data type of each of the variables.

19. The system of claim 15, wherein the expression evaluator is further configured to display a graphical view of the expression data based on the evaluating of the expression.

20. The system of claim 19, wherein the expression evaluator is further configured to update the displayed graphical view based on the reevaluating of the expression using the adjusted value of the at least one of the variables.

21. The system of claim 19, wherein the graphical view is displayed as a chart.

22. The system of claim 21, wherein the expression evaluator is further configured to enable the user to specify a chart type, wherein the chart is displayed according to the specified chart type.

23. The system of claim 15, further comprising:
an analysis manager to enable the user to select an option to save the adjusted value of the at least one of the variables of the expression,
wherein the GUI manager is further configured to receive, from the user, the selected option to save the adjusted value of the at least one of the variables, and further configured to graphically display a save form in response to receiving the selected option to save, the save form including one or more data fields, wherein the user may enter information, associated with the adjusted value of the at least one of the variables, into the one or more data fields, and
wherein the analysis manager is further configured to save the adjusted value of the at least one of the variables and the associated information entered by the user.

24. The system of claim 23, wherein the analysis manager is further configured to enable the user to select an option to load one of a plurality of previously saved adjusted values of the at least one of the variables of the expression,
wherein the GUI manager is further configured to receive, from the user, the selected option to load the one of the plurality of previously saved adjusted values, and further configured to graphically display a load form in response to receiving the selected option to load, the load form including a list of the plurality of previously saved adjusted values, wherein the user may select the one of the plurality of previously saved adjusted values from the list, and
wherein the analysis manager is further configured to load the one of the previously saved adjusted values selected by the user from the list.

25. A tangible computer readable storage medium having instructions stored thereon that, when executed by a computing device, cause the computing device to perform a method comprising:
evaluating an expression having a plurality of variables using expression data corresponding to the variables;
generating graphical user interface controls for the variables of the expression;
binding each variable of the expression to one or more graphical user interface controls generated in the generating step;
graphically displaying the bound graphical user interface controls for the variables of the expression;
receiving from a user an adjusted value of at least one of the variables, the user having adjusted said at least one of the variables using one or more of the bound graphical user interface controls;
re-evaluating the expression using the adjusted value of the at least one of the variables;
receiving, from the user, an indication to further adjust a particular one of the plurality of the variables of the expression based on an additional variable to the expression, wherein the additional variable is not one of the evaluated plurality of variables of the expression; and
graphically displaying, responsive to receiving the indication, an additional user interface control corresponding to the additional variable, wherein an adjustment of the additional variable using the additional user interface control changes a value of the particular variable of the expression, wherein both the additional user interface control and the additional variable were unavailable prior to receiving the indication, and wherein the plurality of variables of the expression remain operable independent of the additional user interface control of the additional variable.

* * * * *